United States Patent
Lin et al.

(10) Patent No.: US 9,224,066 B2
(45) Date of Patent: Dec. 29, 2015

(54) OBJECT DETECTION VIA VALIDATION WITH VISUAL SEARCH

(71) Applicant: Adobe Systems Incorporated, San Jose, CA (US)

(72) Inventors: Zhe Lin, Fremont, CA (US); Jonathan Brandt, Santa Cruz, CA (US); Xiaohui Shen, Evanston (CN)

(73) Assignee: Adobe Systems Incorporated, San Jose, CA (US)

( * ) Notice: Subject to any disclaimer, the term of this patent is extended or adjusted under 35 U.S.C. 154(b) by 227 days.

(21) Appl. No.: 13/782,735

(22) Filed: Mar. 1, 2013

(65) Prior Publication Data
US 2014/0247963 A1    Sep. 4, 2014

(51) Int. Cl.
*G06K 9/62* (2006.01)
*G06K 9/68* (2006.01)
*G06K 9/00* (2006.01)
*G06K 9/32* (2006.01)

(52) U.S. Cl.
CPC .......... *G06K 9/6202* (2013.01); *G06K 9/00228* (2013.01); *G06K 9/685* (2013.01); *G06K 9/00221* (2013.01); *G06K 9/3241* (2013.01)

(58) Field of Classification Search
CPC .......... G06K 9/00221; G06K 9/00228; G06K 9/00241; G06K 9/6262; G06K 9/3233; G06K 9/3241; G06T 7/0024; G06T 7/003
See application file for complete search history.

(56) References Cited

U.S. PATENT DOCUMENTS

| | | | |
|---|---|---|---|
| 6,445,819 B1 * | 9/2002 | Kinjo | 382/173 |
| 6,885,760 B2 * | 4/2005 | Yamada et al. | 382/118 |
| 7,483,919 B2 * | 1/2009 | Galperin | 1/1 |
| 8,811,726 B2 * | 8/2014 | Belhumeur et al. | 382/159 |
| 2009/0202107 A1 * | 8/2009 | Wilson | 382/103 |
| 2010/0040288 A1 * | 2/2010 | Yen et al. | 382/195 |
| 2010/0272363 A1 * | 10/2010 | Steinberg et al. | 382/190 |
| 2011/0013845 A1 * | 1/2011 | Tu et al. | 382/218 |

OTHER PUBLICATIONS

Guodong, et al. "Patch-based Image Correlation with Rapid Filtering." Computer Vision and Pattern Recognition, 2007. CVPR '07. (2007): 1-6. Print.*

Divvala, et al. "Object Instance Sharing by Enhanced Bounding Box Correspondence." Proceedings of the 23rd British Machine Vision Conference (2011). Print.*

* cited by examiner

*Primary Examiner* — Michael A Newman
(74) *Attorney, Agent, or Firm* — Kilpatrick Townsend & Stockton LLP

(57) ABSTRACT

One exemplary embodiment involves receiving, at a computing device comprising a processor, a test image having a candidate object and a set of object images detected to depict a similar object as the test image. The embodiment involves localizing the object depicted in each one of the object images based on the candidate object in the test image to determine a location of the object in each respective object image and then generating a validation score for the candidate object in the test image based at least in part on the determined location of the object in the respective object image and known location of the object in the same respective object image. The embodiment also involves computing a final detection score for the candidate object based on the validation score that indicates a confidence level that the object in the test image is located as indicated by the candidate object.

23 Claims, 12 Drawing Sheets

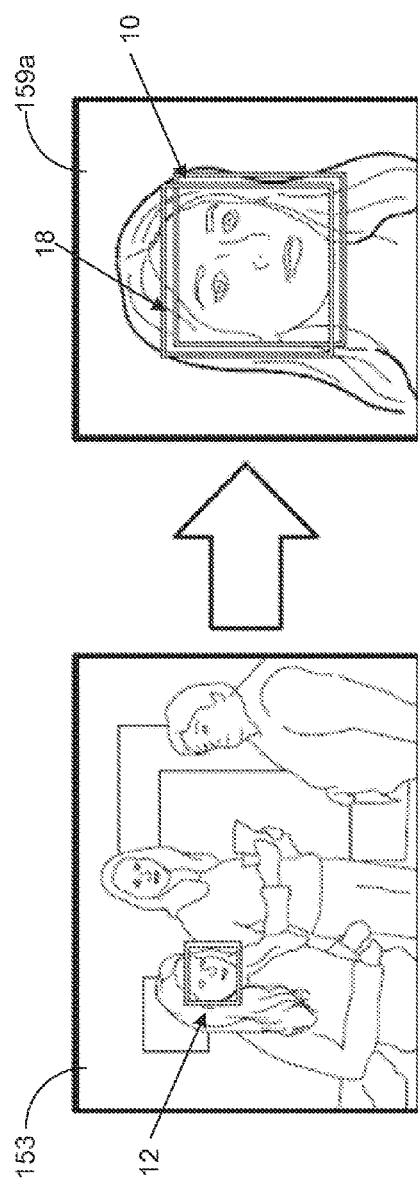
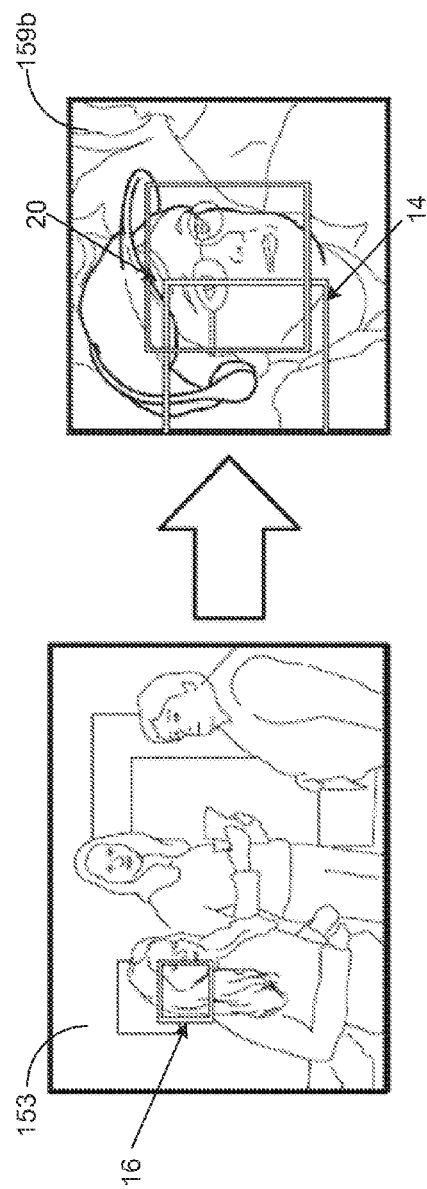

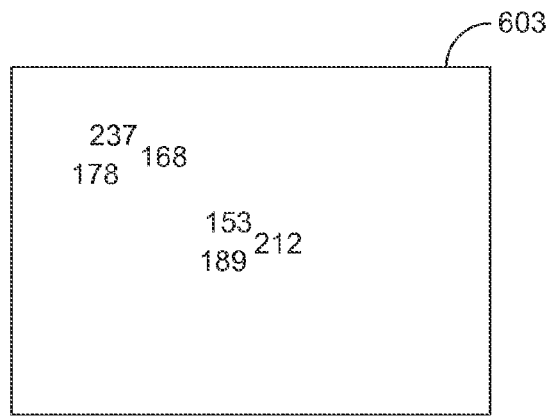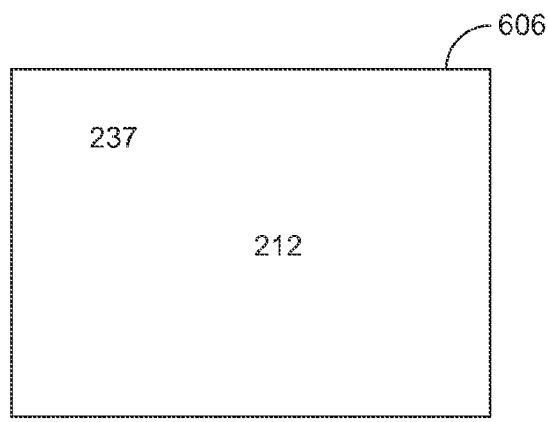
FIG. 7

OBJECT DETECTION VIA VALIDATION WITH VISUAL SEARCH

FIELD

This disclosure relates generally to computer software and more particularly relates to the creation, modification, use, and distribution of images and similar electronic content.

BACKGROUND

Many conventional approaches to detecting objects in images are based on a sliding window approach. For example, if the object to be detected is a face of an individual, the sliding window approach calls for sliding a rectangle across the image and collecting "face likelihood" information to implement face detection. One of various conventional techniques may be applied to implement the object detection, such as, for example, the Viola-Jones detection framework using the Haar-wavelet technique. These conventional techniques involve training a binary classifier from an image database that consists of both objects and non-objects and then sliding a rectangle across each image in the database to perform the detection and in some instances, varying the scale of the images based on the test image to be detected. Each subimage corresponding to the sliding rectangle is examined by the binary classifier to determine if it is an instance of the object category, e.g., a face.

However, existing use of the sliding window approach can provide poor results in certain circumstances. For example, for face detection, a test image may be a profile view of a face, a slanted view of a face, and/or may otherwise depict an occluded view of a face. The sliding window approach is limited with respect to detecting these types of faces because of the difficulty of learning a good classifier encoding all possible variations.

SUMMARY

Disclosed are embodiments for validating one or more images detected to depict an object. Disclosed are embodiments for identifying a candidate region of a test image as potentially depicting an instance of an object and identifying a first region in an object image that is similar to the candidate region of the test image, the object image being different from the test image. The disclosed embodiments also performing a comparison of the first region with a second region of the object image, the second region known to actually depict the instance of the object and determining a validation score for the candidate region based on the comparison. The identifying the candidate region, identifying the first region, performing the comparison, and determining the validation score are performed by a processor of a computer device executing instructions.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

The file of this patent contains at least one drawing executed in color. Copies of this patent with color drawing(s) will be provided by the Patent and Trademark Office upon request and payment of the necessary fee. These and other features, aspects, and advantages of the present disclosure are better understood when the following Detailed Description is read with reference to the accompanying drawings, where:

FIG. 1A illustrates validation of a candidate rectangle of a test image using a known location of an object in an object image;

FIG. 1B illustrates validation of another candidate rectangle of a test image using a known location of an object in an object image;

FIG. 7 is an illustration of selecting maximum modes and implementing non-maxima suppression;

DETAILED DESCRIPTION

Figure 2:
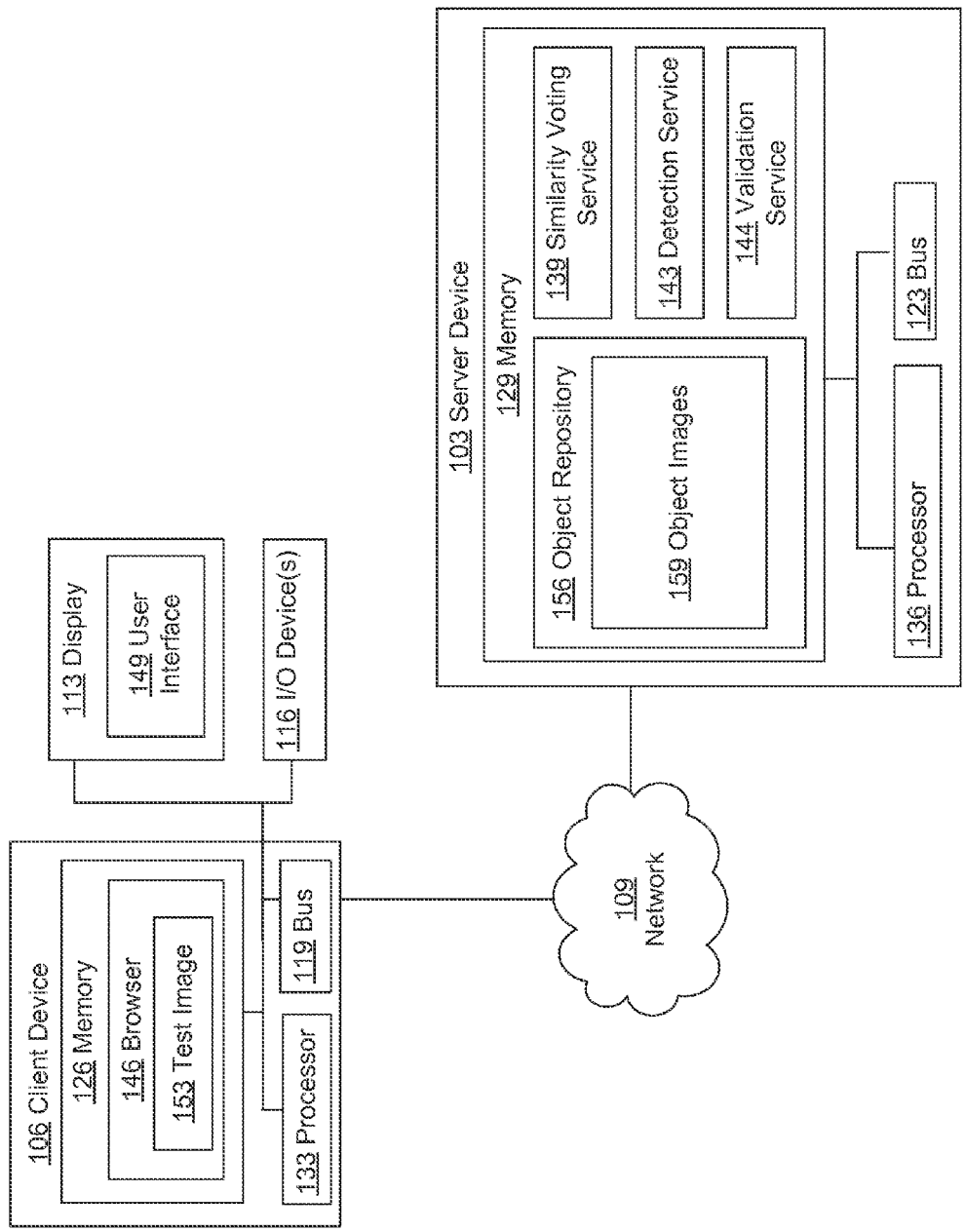
FIG. 2 is a block diagram depicting exemplary computing devices in an exemplary computing environment for implementing certain embodiments.

Methods and systems are disclosed for validating object detection. For example, a face detection technique can result in the detection of a face within an image and provide a rectangle (or other-shaped window) identifying an estimated location of the detected face in the image. A rectangle that surrounds the entire portion of the face can be considered a better result than a rectangle that cuts off a portion of the face and/or includes significant amounts of a non-face portion of the image. Validation techniques are provided herein that facilitate automatic or semi-automatic determinations of whether an object detection result is a good result or a bad result. While the following examples relate generally to face detection and validation, the techniques disclosed are applicable to detecting other types of objects in addition to faces, including but not limited to buildings, vehicles, roads, weapons, animals, plants, and numerous other types of objects.

In one embodiment, after face detection is performed, several candidate rectangles are obtained. Some of the rectangles may not identify true faces. A face validation technique is performed to identify false positives and/or further improve the detection accuracy in subsequent face detection attempts. Each rectangle resulting from the face detection (referred to herein as the test image rectangle) is validated using one or more object images. One or more of the object images may depict faces at known locations. The test image rectangle is used to localize a rectangle on an object image. The localized rectangle is a portion of the object image that corresponds to the portion of the object image that is similar to the portion of the test image within the test image rectangle of the test image. For example, in FIG. 1A, the portion of the object image 159a in localized rectangle 10 is similar to the portion of the test image 153 in rectangle 12. Similarly, in FIG. 1B, the portion of the object image 159b in localized rectangle 14 is similar to the portion of the test image 153 in rectangle 16. A localized rectangle can be compared with a rectangle that is known to accurately identify, e.g., surround, the object, such as rectangle 18 of object image 159a in FIG. 1A and rectangle 20 of object image 159b in FIG. 1B. The accuracy of the test image rectangle, e.g., how well it identified a face, is reflected in the relationship between the localized rectangle and the rectangle known to accurately identify the object. In FIG. 1A the closely overlapping rectangles 10 and 18 in the object image 159a signify that the test image rectangle 12 in the test image 153 accurately identifies the object. In FIG. 1B, the offset between the rectangles 14 and 20 in the object image 159b signifies that the test image rectangle 16 does not as accurately identify the object.

Each candidate rectangle in the test image 153 may be validated using more than one object image 159. For example, a candidate test image rectangle in the test image 153 may be used to localize the object in each of the object images 159. The localized rectangle in each object image 159 is then compared with the known rectangle in the respective object image. The accuracy of the localized rectangle when compared with the known rectangle reflects the accuracy of the detection of the test image rectangle. The amount of overlap between the localized rectangle and the known rectangle in each object image 159 can be calculated. A validation score for each candidate test image rectangle can be determined based on the calculated overlap between a localized rectangle and the known rectangle in each object image 159. A final detection score for each candidate test image rectangle can be determined based on the validation score for the candidate test image rectangle and an aggregated similarity score between the test image and each of the respective object images.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 2 depicts an exemplary computing environment for detecting objects depicted in a test image based at least in part on similarity voting maps generated on the test image for a collection of object images stored in a data store. The methods and systems disclosed herein are also applicable on other computing systems and environments. The environment shown in FIG. 2 includes a wired or wireless network 109 connecting various devices 103 and 106. In one embodiment, the network 109 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, client device 106 is shown with a display 113 and various input/output devices 116. A bus, such as bus 119 and bus 123, will typically be included in a device as well.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 103 and 106 each have a computer-readable medium such as memory 126 and 129 coupled to a processor 133 and 136 that executes computer-executable program instructions and/or accesses stored information. Such processors 133 and 136 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Server device 103 is an example of a server. A "server device" may be used to perform the searching of items based on a received search criteria from the user. For example, the server device 103 may include a similarity voting service 139 and a detection service 143.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 2, client device 106 includes a memory 126 that includes browser 146. In one embodiment, the browser 146 may be a browser that renders a user interface 149 on the display 113 associated with the client device 106. The browser 146 may be executed to transmit a request to the server device 103 for detecting objects depicted in a test image 153. For example, a user on the client device 106 may request to detect one or more objects depicted in a test image 153 by manipulating the user interface 149 rendered on the display 113. The browser 146 may then transmit the request to the detection service 143 and in response, receive an indication of the detected object. In one embodiment, upon receiving the indication of the detected object, the browser 146 may render the indication of the detected object on the display 113.

The server device 103 includes a memory 129 that includes the similarity voting service 139, the detection service 143, a validation service 144, an object repository 156, and/or other components. The object repository 156 includes a collection of object images 159. For example, the object images 159 may depict faces of individuals and the test image 153 may depict a face of one more of individuals. The detection service 143 can detect objects in a test image in various ways. In one embodiment, the detection service 143 receives the test image 153 and invokes the similarity voting service 139 to generate a similarity voting map for the test image 153 based on each object image 159 included in the object repository 156. The detection service 143 may use a set of object images 159 that are each known to depict a particular type of object, such as a face at a particular location. In one embodiment, the detection service 143 receives similarity voting maps generated by the similarity voting service 139 and modifies each of the similarity voting maps to attempt to eliminate false positive results. For example, this may involve gating each similarity voting map using a similarity threshold. The gated maps are aggregated to provide an aggregate similarity voting map.

Having generated the aggregate similarity voting map, the detection service 143 then can apply a technique to identify the most representative score or scores within an aggregate similarity voting map. For example, an aggregate map may have a similarity score of 10 that is in a neighborhood surrounded by other nearby high scores in the same neighborhood that all reflect a similarity of a face to the corresponding portions of the test image represented by those scores. High scores in portions of the test image that are further away (i.e. outside of the neighborhood) may correspond to a different face but high scores that are near one another (i.e. within the neighborhood) can be treated as corresponding to a single object. Accordingly, a technique can be applied to select the best score or scores. In one embodiment, this involves the use of a maximum mode and non-maxima suppression of the aggregate similarity voting map. The resulting aggregated similarity voting map then reflects the detected location(s) of the object in the test image 153. For example, a sub-rectangle can be determined from the aggregate similarity voting map where the highest similarity represents a center of the sub-rectangle of the test image thereby localizing the object in the test image.

The validation service 144 receives the object images 159 and the test image 153 rectangles and then generates a validation score for each of the test image 153 rectangles. For example, the validation service 144 determines a location of the object in the respective object image 159 (referred to herein as "localizing" the object) and compares the determined location with a known location of the object in the object image 159 to generate the validation score.

In one embodiment, a user on the client device 106 transmits the request to detect an object in test image 153 by manipulating one or more user interfaces 149 rendered on the display 113 via one or more I/O devices 116, such as a keyboard and/or a mouse. The detection service 143 receives the request and invokes the similarity voting service 139 to generate a similarity voting map of the test image 153 based on each one of the object images 159 in the object repository 156, as described in U.S. patent application Ser. No. 13/552,595 entitled "Image Retrieval with Spatially-Constrained Similarity Measure and k-NN re-ranking" filed on Jul. 18, 2012 and U.S. patent application Ser. No. 13/624,615 entitled "A Technique to Mobile Product Image Search by Automatic Query Object Localization and Segmentation Application" filed on Sep. 21, 2012 both of which are hereby incorporated by reference in its entirety.

To this end, the similarity voting service 139 evaluates a similarity between the test image 153 and each one of the object images 159 in the object repository 156. A sub-rect-angle indicating a location of the object in the object image 159 may have been previously identified. The similarity voting service 139 evaluates the content of the sub-rectangle with the object depicted in the test image 153, such as the features within the sub-rectangle. For instance, spatial information of each object image 159 may be represented by a sub-rectangle $B=\{x_c, y_c, w, h, \theta\}$ where $(x_c, y_c)$ is the coordinate of the rectangle center, w and h are the width and height of the rectangle respectively, and $\theta$ is the rotated angle of the rectangle. The similarity voting service 139 determines whether the test image 159 has similar features as the features of the sub-rectangle in the object image 159. For example, the sub-rectangle in the test image 153 may be represented as $B'=\{x_c+x_t, y_c+y_t, s\cdot w, s\cdot h, \theta=\alpha\}$. The similarity voting service 139 determines the sub-rectangle in the test image 153 based on each object image 159 and generates a voting similarity map based on the similarity of features between the sub-rectangle of the test image 153 and the sub-rectangle of each object image 159. For example, the similarity may be represented by a numerical floating value such as 0.5, 10.8, 100.4 and the like. In one embodiment, the similarity voting service 139 may calculate the relative locations of features within the object image 159 with respect to the center and compare the calculated locations with the corresponding locations within the test image 153 to determine if the feature at the corresponding location in the test image 153 matches the feature of the object image 159.

Next, the similarity voting service 139 generates a similarity voting map between the test image 153 and each object image 159. For example, the similarity voting service 139 identifies matching features between a candidate portion of the test image 153 and portions of the object image 159 and determines a location of a rectangle in the test image 153 that corresponds with the object in the object image 159 based on the matching features. The similarity voting service 139 then maps a similarity voting score for the determined location. For instance, if the matching feature pairs between the test image 153 and the object image 159 are spatially consistent, then the corresponding rectangle locations should be similar and thus the similarity voting score would be higher than if the matching feature pairs are not spatially consistent. The similarity voting service 139 generates a voting score for a complete set of matching pairs of elements between the test image 153 and the object image 159 and generates a voting map based on the cumulative voting scores of all of the matched features.

The detection service 143 then determines which ones of the similarity voting scores generated by the similarity voting service 139 is within a similarity threshold. To this end, the detection service 143 implements a "gating" approach to determine which portions of the similarity voting maps are within the similarity threshold for each object image 159. For example, the detection service 143 subtracts the similarity threshold from each similarity voting map and sets any negative values to zero. Each object image 159 in the object repository 156 may be associated with a similarity threshold. For instance, the similarity threshold may be based at least in part on an empirical estimation that an object depicted in the test image 153 is similar to the object depicted in the object image 159. In one embodiment, the similarity threshold represents the maximum similarity score between the object image 159 and any possible portion (for example, a non-face portion) of any test image 153 which can be determined based on past results through a training process. In the case of face detection, subtracting the similarity threshold from the similarity voting maps reduces the chances of non-face portions of the test image 153 being positively detected as faces. The detection service 143 implements the gating by subtracting the similarity threshold value from each similarity voting map thereby reducing all of the similarity scores represented by the similarity voting map. Any negative scores are replaced with a zero as the negative scores correspond with non-face portions of the test image 153 that would yield a false positive. The remaining similarity scores in the similarity voting map may then be used in the aggregation, as will be described.

Each object image 159 is associated with a similarity threshold. In one embodiment, the similarity threshold may be discriminatively learned. For example, a collection of negative training sets may be collected defined as N. Each object image 159 in the object repository 156 is defined as $c_i$ and the similarity threshold for the respective object image 153 is defined as $t_i$. In solving for $t_i$. The similarity threshold for each object image 159 can be defined as:

$$t_i = \max_{j \in N} s_i(x_j)$$

where $s_i(x)$ is the similarity score between the object image 159 and a test image 153 and N represents a negative training set.

The detection service 143 then aggregates all of the similarity voting maps after similarity voting maps have been gated using the similarity threshold. In one embodiment, the aggregation is defined as follows:

$$S(x) = \sum_{i: s_i(x) > t_i} (s_i(x) - t_i)$$

where $S(x)$ is the final similarity score for the test image 153, $s_i(x)$ is the similarity score between the test image 153 and the object image 159, and t is the corresponding similarity threshold. The aggregation of the similarity voting maps is implemented after the gating to remove any similarity voting maps of object images 159 that are unlikely to depict the object in the test image 153. Thus, any candidate rectangles in the similarity voting maps associated with a similarity score that is less than the similarity threshold are treated as providing no information about the object depicted in the test image 153. Excluding the candidate rectangles in the similarity voting maps associated with a similarity score that is less than the similarity threshold in the aggregation of the similarity voting maps will result in a higher confidence in the aggregation. After aggregating the similarity voting maps that are within the similarity threshold, the detection service 143 then selects the maximum modes from the maps with non-maxima suppression to get the final detection results. Non-maximum suppression is a local maximum search where a local maximum is greater than the value of its surrounding neighbors. For example, the high similarity portion of the aggregated similarity voting map may be the center of the sub-rectangle that defines the bounds of the object in the test image 153.

However, the detected candidate sub-rectangles that define the bounds of the object in the test image 153 need to be validated. In some instances, the detection approach discussed above yields false positives that do not actually indicate a location of the center of the object in the test image 153. The validation service 144 validates each one of the candidate sub-rectangles of test image 153 detected by the above detection approach and/or other detection technique. Validation improves the detection results by further identifying any false positives to be disregarded. In one embodiment, the validation service 144 receives one and/or a set of object images 159 that have been detected to depict a similar object as the test image 153 and also receives the candidate rectangles of the test image 153.

To validate a candidate rectangle of the test image 153, the validation service 144 localizes the objects in each of the one or more object images 159. This can involve determining a location of the object in each of the respective object images 159. The determined location and the known location of the object in each one of the object images 159 are then compared and a validation score is generated. A validation score may be generated for each candidate rectangle in the test image 153 based on an amount of overlap between the determined location and the known location of rectangles in each of one or more object images. In one embodiment, the validation score may then be compared with a threshold value to disregard any false positives. For example, if the validation score is below a threshold value, then the candidate rectangle is likely a false positive and may be disregarded. Additionally, a detection score may then be generated for each candidate rectangle of the test image 153 based on the validation score and an aggregated similarity score between the object images 159 and the test image 153. In one embodiment, the detection score for each candidate rectangle in the test image 153 reflects a confidence level that the center of an object is located at the center of the candidate rectangle.

Figure 3:
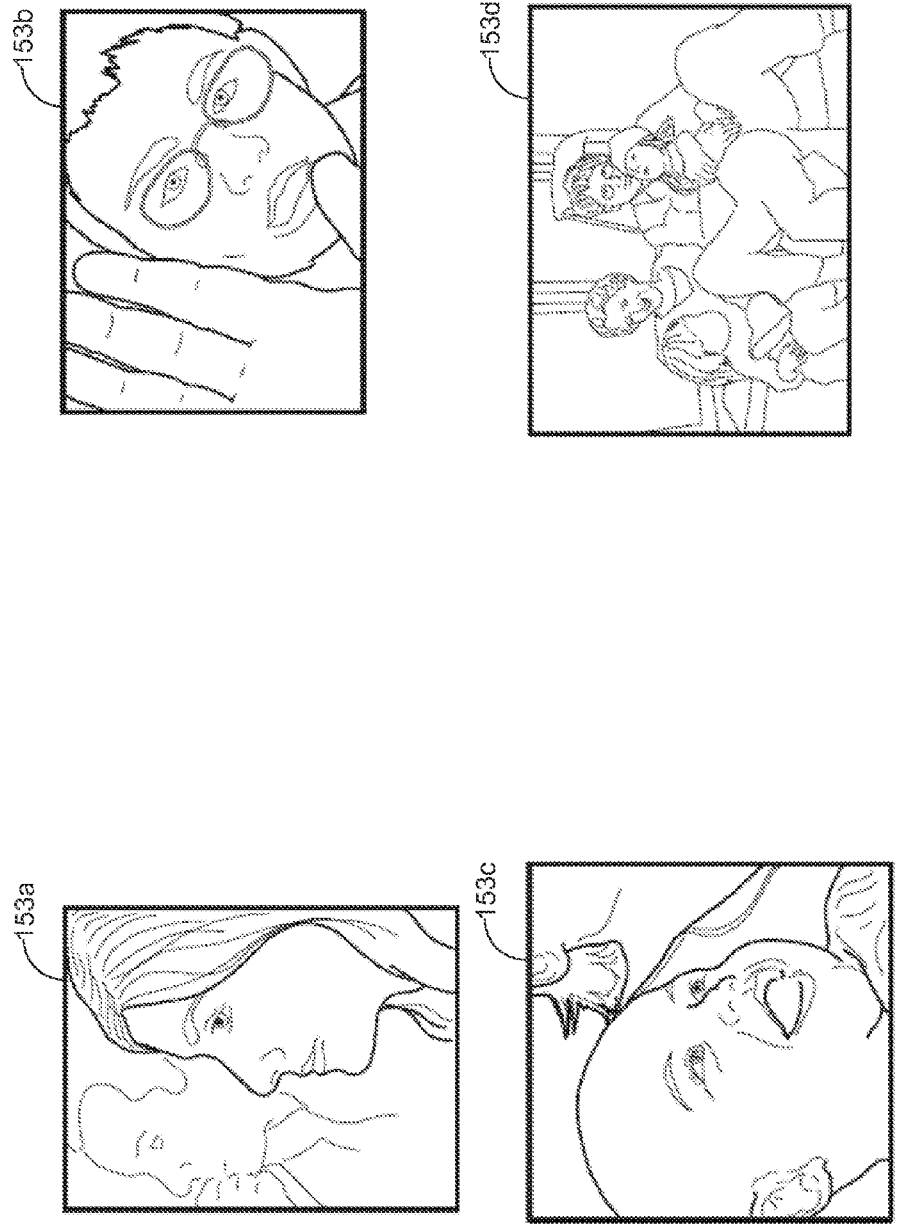
FIG. 3 is an illustration of images for detecting objects depicted in the images that may result in poor results using the sliding window approach.

FIG. 3 depicts a plurality of test images 153 with challenging views. For example, test image 153a depicts a face with a profile view that only shows a portion of the features of a face. Test image 153b depicts a face partially occluded that skews the view of the features of a face. For instance, a hand casts a shadow across the face, blocks a portion of the face and alters the overall focus of the image to create a challenging image for detection. Test image 153c depicts a large face with an angled view that shows only a portion of the features of the face and test image 153d shows multiple faces at varying angles where some of the faces are partially occluded. The test images 153 represent challenging views for image detection using conventional approaches such as the sliding window approach.

Figure 4:
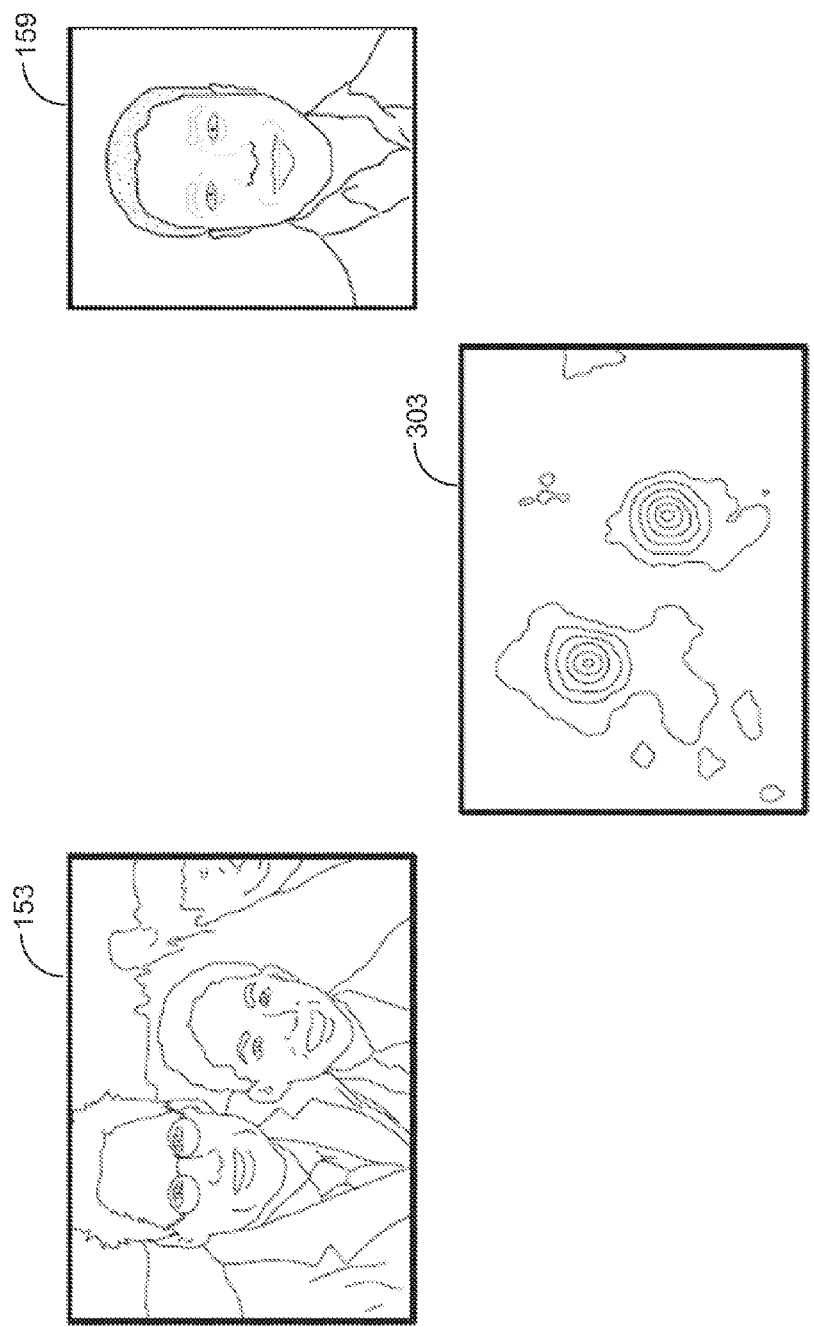
FIG. 4 is an illustration of a similarity voting map defining the similarity between a test image and an exemplar image.

FIG. 4 depicts a test image 153, an object image 159 and a similarity voting map 303. In one embodiment, a user on the client device 106 may provide the test image 153 for image detection by manipulating a user interface 149 (FIG. 2) using one or more I/O device 116 (FIG. 2) associated with the client device 106. In this example, the test image 153 includes a plurality of faces for detection and includes two faces. In one embodiment, the detection service 143 (FIG. 2) receives the request to detect the objects (i.e., faces) in the test image 153 and invokes the similarity voting service 139 (FIG. 2) to generate a plurality of similarity voting map 303 for the test image 153 based on each of the object images 159 (FIG. 2) of the object repository 156 (FIG. 2). In this example, the object image 159 represents an exemplar image from the object repository 156 and the similarity voting map 303 represents the similarity between the test image 153 and the object image 159.

The similarity voting service 139 generates the similarity voting map 303 based on similarity scores between a rectangle in the test image 153 and a rectangle in the object image 159. In one embodiment, the similarity score may be defined as follows:

$$S(x, c_i) = \sum_{k=1}^{N} \sum_{\substack{(f_i, g_j) \\ f_i \in x, g_j \in c_i \\ w(f_i) = w(g_j) = k \\ \|T(L(f_i)) - L(g_j)\| < s}} \frac{idf^2(k)}{tf_x(k) \cdot tf_{c_i}(k)}$$

where x is the test sample (i.e., a sub-rectangle in the test image 153), and $c_i$ is the i-th object image 159 in the object repository 156. $f_i$ are the local features extracted from the test sample x, and $g_j$ are the local features extracted from the ci object image 159. k denotes the k-th visual word in a learned vocabulary. For instance, a visual word corresponds to a cluster of extracted features of an image and the vocabulary corresponds to all of the clusters of the image. idf(k) is the inverse document frequency of k, $tf_x(k)$ and $tf_{c_i}(k)$ are the term frequencies (i.e., number of occurrences) of k in x and $c_i$ respectively. $L(t)=(x_f, y_f)$ is the 2D image location of f. The spatial constraint $\|T(L(f_i))-L(g_j)\|<\epsilon$ means that the locations of the two matched features should be sufficiently close under certain transformations. In one embodiment, this similarity score may be calculated on multiple scales.

The similarity voting service 139 generates the similarity voting map 303 based on the similarity scores for matching features between portions of the test image 153 and the rectangle of the object image 159 as described above. In FIG. 3, the matching features of the faces in the test image 153 and the object image 159 are determined for a sub-rectangle and mapped, where densely occurring concentric shapes indicate a high similarity score and sparsely occurring concentric shapes indicate a low similarity score.

Figure 5:
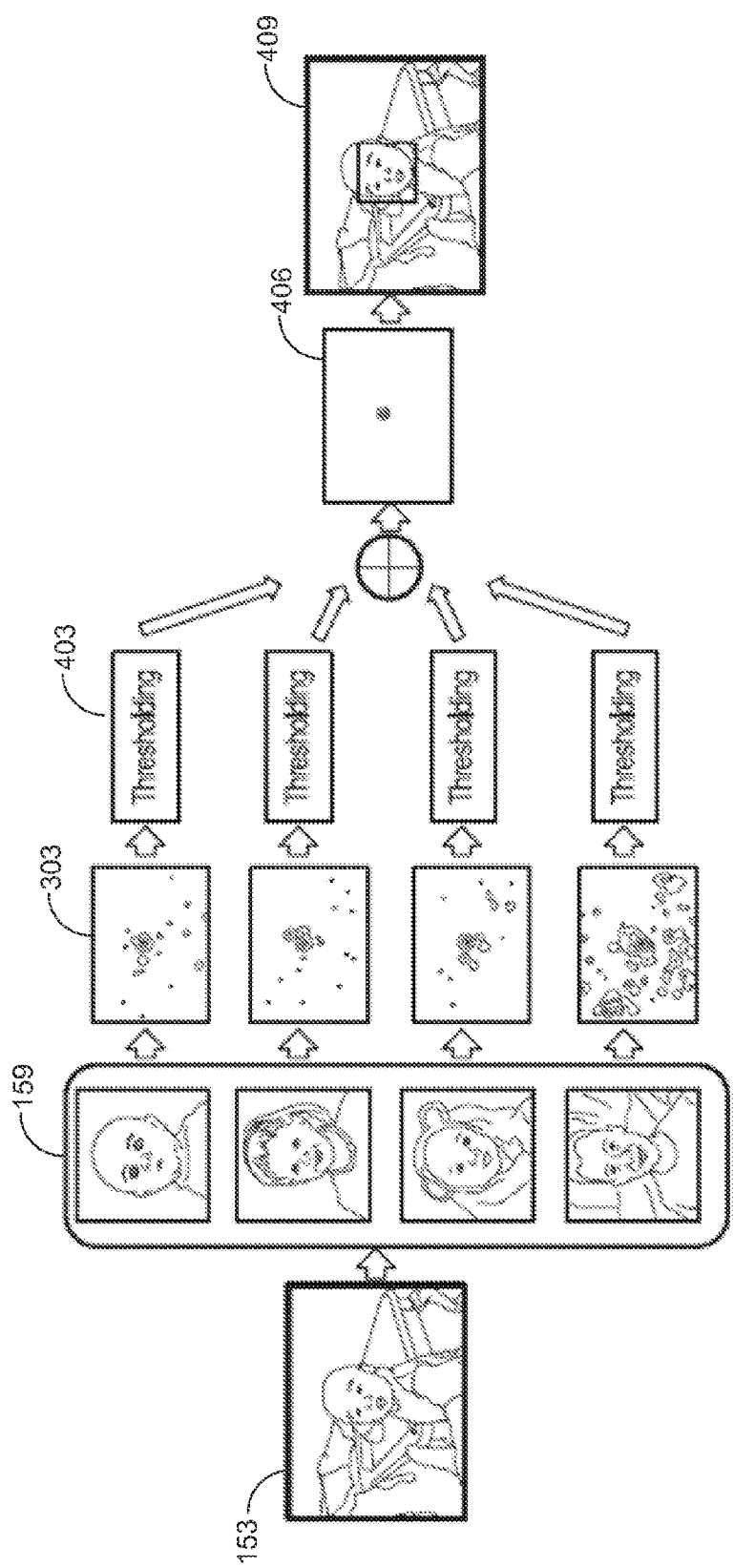
FIG. 5 is an illustration of a pipeline for detecting an object depicted in a test image based on similarity voting maps.

FIG. 5 illustrates a pipeline for image detection using the embodiments described herein. Included in FIG. 5 is an example of a test image 153, a set of object images 159 from the object repository 156 (FIG. 2), a set of similarity voting maps 303 depicting the similarity scores on a voting map between the test image 153 and the respective object image 159, thresholding 403, an aggregate similarity voting map 406, and a detected image 409. As discussed above, the detection service 143 receives the test image 153 to detect the object (i.e., face) depicted in the test image 153. In response, the detection service 143 invokes the similarity voting service 139 to generate the similarity voting maps 303 for each one of the object images 159 of the object repository 156 based on the test image 153. For example, the similarity voting service 139 generates a similarity voting map 303 between the test image 153 and each object image 159 by scoring the similarity of matching features between portions of the test image 153 and a sub-rectangle of the object image 159, as discussed above. Therefore, the similarity voting service 139 generates a similarity voting map 303 for each object image 159 in the object repository 156.

Next, the detection service 143 implements thresholding to determine whether each of the similarity voting maps 303 is within a similarity threshold. In one embodiment, the detection service 143 determines whether a similarity voting map 303 is associated with a similarity score that is within a similarity threshold for the corresponding object image 159. Upon determining which similarity voting maps 303 are equal to or greater than the similarity threshold, the detection service 143 aggregates the similarity voting maps 303 that are equal to or greater than the similarity threshold to generate an aggregate similarity voting map 406. In one embodiment, aggregating the similarity voting maps 406 may be defined as follows:

$$S(x) = \sum_{i:s_i(x)>t_i} (s_i(x) - t_i)$$

where $S(x)$ is the final similarity detection score of x which is the test image 153, $s_i(x)$ is the similarity score between the test image 153 x and the object image 159 $c_i$, and $t_i$ is the corresponding similarity threshold. Upon generating the aggregated voting map 406, the detection service 143 selects the detected image 409 by selecting the maximum modes from the aggregated voting map 406 with non-maxima suppression.

Figure 6:
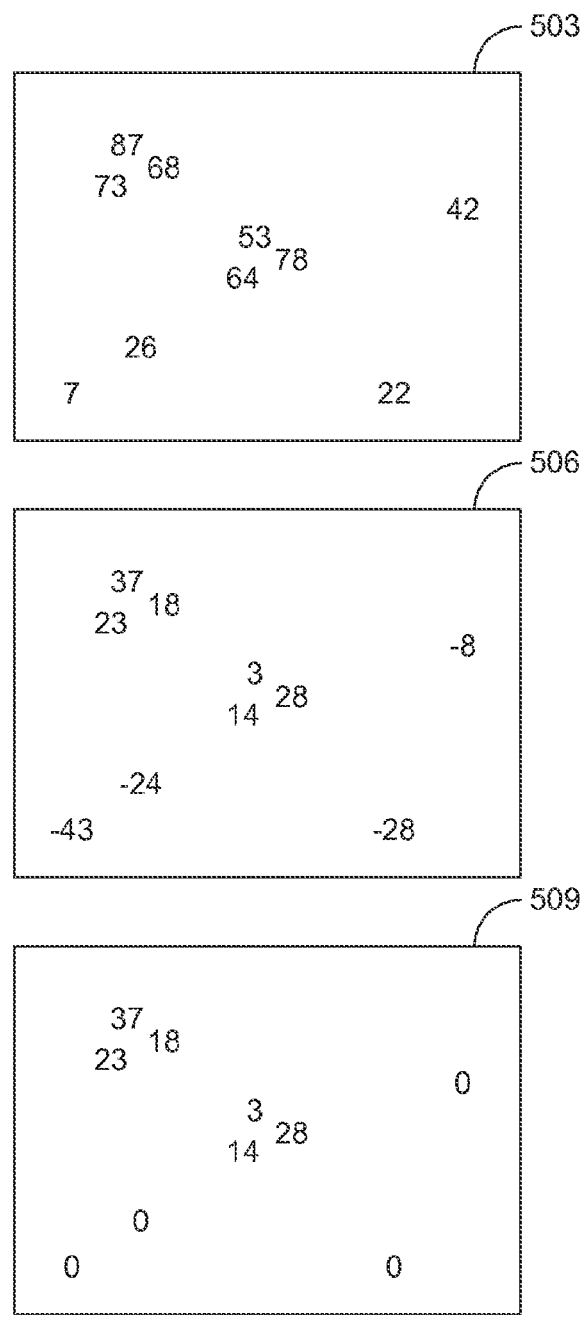
FIG. 6 is an illustration of gating a similarity voting map based on a similarity threshold associated with the object image used to generate the similarity

FIG. 6 is all an illustration of gating implemented on the similarity voting maps using a similarity threshold. The similarity voting map depicts a similarity between one an object image and a test image. As shown in FIG. 6, three similarity voting maps 503, 506 and 509 are depicted. A similarity voting map is comprised of one or more similarity scores that are generated as discussed above. For example, the similarity voting service 139 (FIG. 2) generates a similarity scores at different locations. In this embodiment, the similarity scores are represented as numerical values in map 503.

To implement gating, the detection service 143 identifies the similarity threshold for the object image used to generate the similarity voting map 503 and subtracts the similarity scores represented in the similarity voting map 503 with the similarity threshold. For example, the similarity threshold for an object image may be 50. The detection service 143 subtracts each one of the similarity scores by 50 as shown in map 506. In one embodiment, the similarity threshold represents the maximum value of a false positive result using that object image in the past. Any similarity scores below the similarity threshold are likely to be non-object portions of the test image 153 and thus can be disregarded for purposes of object detection.

Subtracting the similarity threshold from the similarity scores may produce negative similarity scores. For example, if the similarity score is not high enough, then the resulting value after the subtraction will be a negative value. The negative similarity scores can be considered to not provide useful information about the possible location of the object in the test image and thus may be disregarded. As such, in the gating process, such negative scores can be zeroed as shown in map 509 so that these values do not adversely affect the aggregation step.

FIG. 7 is an illustration of selecting maximum modes and implementing non-maxima suppression. Shown in FIG. 7 are two similarity voting maps 603 and 606. In one embodiment, map 603 represents an aggregated similarity voting map where the detection service 143 (FIG. 2) has implemented gating on each similarity voting map generated by the similarity voting service 139 (FIG. 2) and aggregated all the gated similarity voting maps. Map 603 includes two neighborhoods of similarity scores that have been aggregated from all of the similarity voting maps generated by the similarity voting service 139. In one embodiment, each neighborhood may correspond to one object depicted in the test image 153. For example, the test image 153 may depict two faces as shown in FIG. 3.

The detection service 143 selects maximum modes in each neighborhood and implements non-maxima suppression of the other modes in the neighborhood to determine the center of the object depicted in the test image. For example, the first neighborhood of similarity scores may correspond to features of a first object depicted in the test image 153 and the second neighborhood of similarity scores may correspond to features of a second object depicted in the test image 153. The detection service 143 identifies the maximum similarity score in each neighborhood and suppresses the non-local maxima in the neighborhood. Thus, as shown in map 606, the remaining scores are 237 of the first neighborhood and 212 of the second neighborhood. The remaining maximum modes of the neighborhoods each represent the center of an object depicted in the test image 153.

Figure 8:
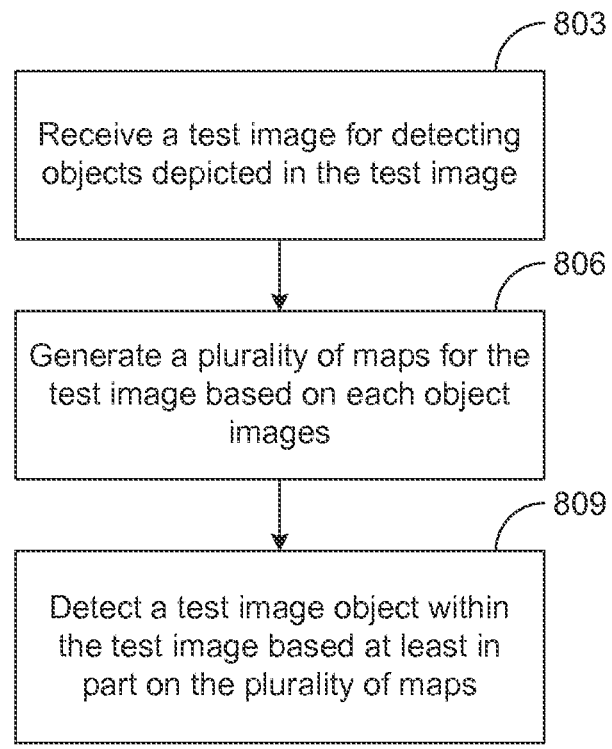
FIG. 8 is a flow chart illustrating an exemplary method of detecting an object depicted in a test image based on similarity voting maps and similarity thresholds.

FIG. 8 is a flowchart that provides one example of the operation of a portion of the detection service 143 (FIG. 2)

according to certain embodiments. It is understood that the flowchart of FIG. 8 provides merely an example of the many different types of functional arrangements that may be employed to implement the operation of the portion of the detection service 143 as described herein. As an alternative, the flowchart of FIG. 8 may be viewed as depicting an example of steps of a method implemented in the computing device 103 (FIG. 2) according to one or more embodiments.

Beginning at step 803, the detection service 143 receives a test image 153 for detecting one or more objects depicted in the test image. For example, a user on a client device 106 (FIG. 2) may provide the test image 153 for detection via a user interface 149 (FIG. 2). In step 806, the detection service 143 invokes the similarity voting service 139 to generate a plurality of maps depicting the similarity between the test image 153 and each one of a plurality of object images 159. In one embodiment, the similarity voting service 139 generates the maps based at least in part on similarity scores determined from matching features between the test image 153 and the object image 159.

Then, in step 809, the detection service 143 detects a test image object within the test image 153 based at least in part on the plurality of maps. In one embodiment, the detection service 143 gates each one of the maps based on the similarity threshold associated with the corresponding object image 159 used to generate the map. To this end, the detection service 143 subtracts the similarity threshold from the similarity scores represented in each map and zeros any resulting negative values to generate a gated map. The detection service 143 then aggregates the gated maps to generate an aggregate map. For example, the detection service 143 adds all of the similarity scores from the gated maps to generate the aggregate map. Having aggregated the gated maps, the detection service 143 then selects the maximum modes in a neighborhood of similarity scores and suppresses the non-maxima nodes of the neighborhood. The resulting aggregated map indicates the location of the objects depicted in the test image 153. For instance, the maximum modes represent the center of one of the objects depicted in the test image 153.

Figure 9:
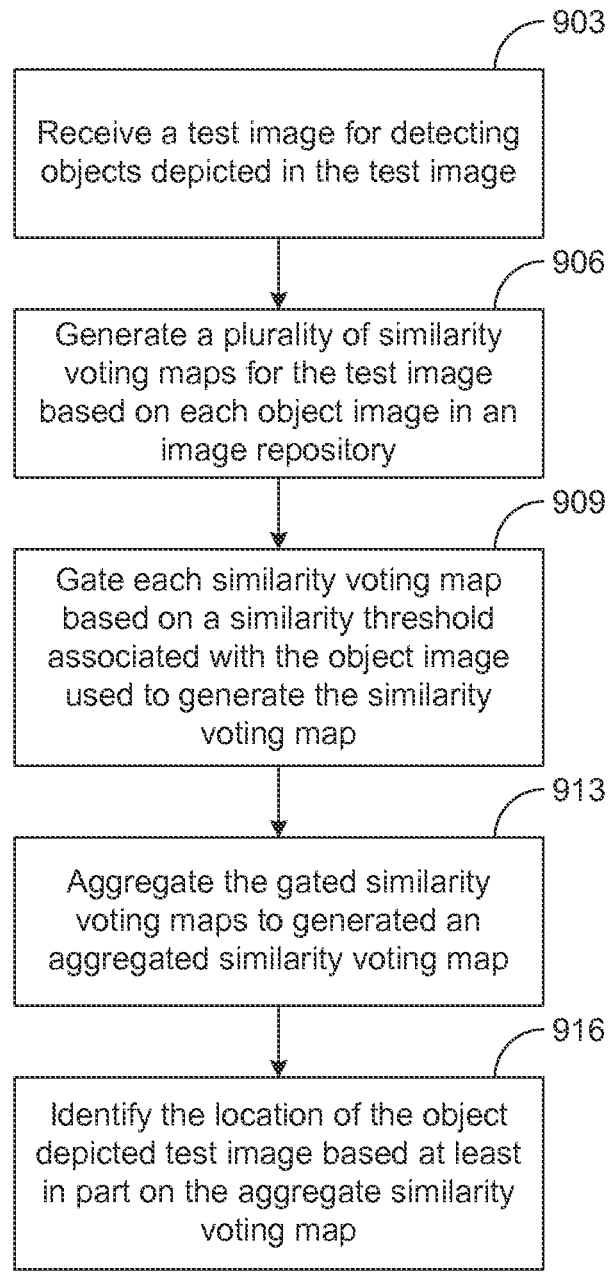
FIG. 9 is a flow chart illustrating another exemplary method of a detection service for detecting an object depicted in a test image.

FIG. 9 is a flowchart that provides one example of the operation of a portion of the detection service 143 (FIG. 2) according to certain embodiments. It is understood that the flowchart of FIG. 9 provides merely an example of the many different types of functional arrangements that may be employed to implement the operation of the portion of the detection service 143 as described herein. As an alternative, the flowchart of FIG. 9 may be viewed as depicting an example of steps of a method implemented in the computing device 103 (FIG. 2) according to one or more embodiments.

Beginning at step 903, the detection service 143 receives a test image 153 (FIG. 2) for detecting objects depicted in the test image 153. In one embodiment, a user on a client device 106 (FIG. 2) may manipulate a user interface 149 via one or more I/O devices 116 (FIG. 2) to transmit a request to the detection service 143 to detect the object in the test image 153. For example, the test image may be a photograph and the object may be a face of an individual.

In step 906, the detection service 143 invokes the similarity voting service 139 to generate a plurality of similarity voting maps for the test image 153 based on each one of the object images 159 (FIG. 2) in an object repository 156 (FIG. 2). In one embodiment, the similarity voting service 139 generates the similarity voting map by identifying matching features between a sub-rectangle of the object image 159 and portions of the test image 153. The similarity voting service 139 then determines the similarity between the matching features in the two images and generates the similarity voting map.

Next, in step 909, the detection service 143 implements gating on each similarity voting map based on a similarity threshold associated with the respective object image 159 used to generate each similarity voting map. In one embodiment, the detection service 143 identifies the similarity threshold for each object image 159 and subtracts the similarity threshold from the similarity scores represented in the similarity voting map generated from that object image 159. Any negative values resulting from the subtraction are zeroed and thus disregarded. These values provide no information as to the location of the object depicted in the test image 153. The remaining values (all positive values) represent a similarity that exceeds the minimum necessary to be similar to object in the object image 159, i.e., a face.

Next, in step 913, the detection service 143 aggregates the similarity voting maps after they have been modified via gating to generate an aggregated similarity voting map. In one embodiment, the aggregated similarity voting includes aggregated similarity scores of all of the gated similarity voting maps. Upon generating the aggregate similarity voting map, in step 916 the detection service 143 identifies the location of the object depicted in the test image 153 based at least in part on the aggregate similarity voting map. For example, the highest similarity as shown in the similarity voting map may represent the center of the object depicted in the test image 153. In one embodiment, local maximum nodes of the aggregate similarity voting map may be identified and their corresponding non-maxima may be suppressed to reduce the likelihood of falsely identifying the location.

Figure 10:
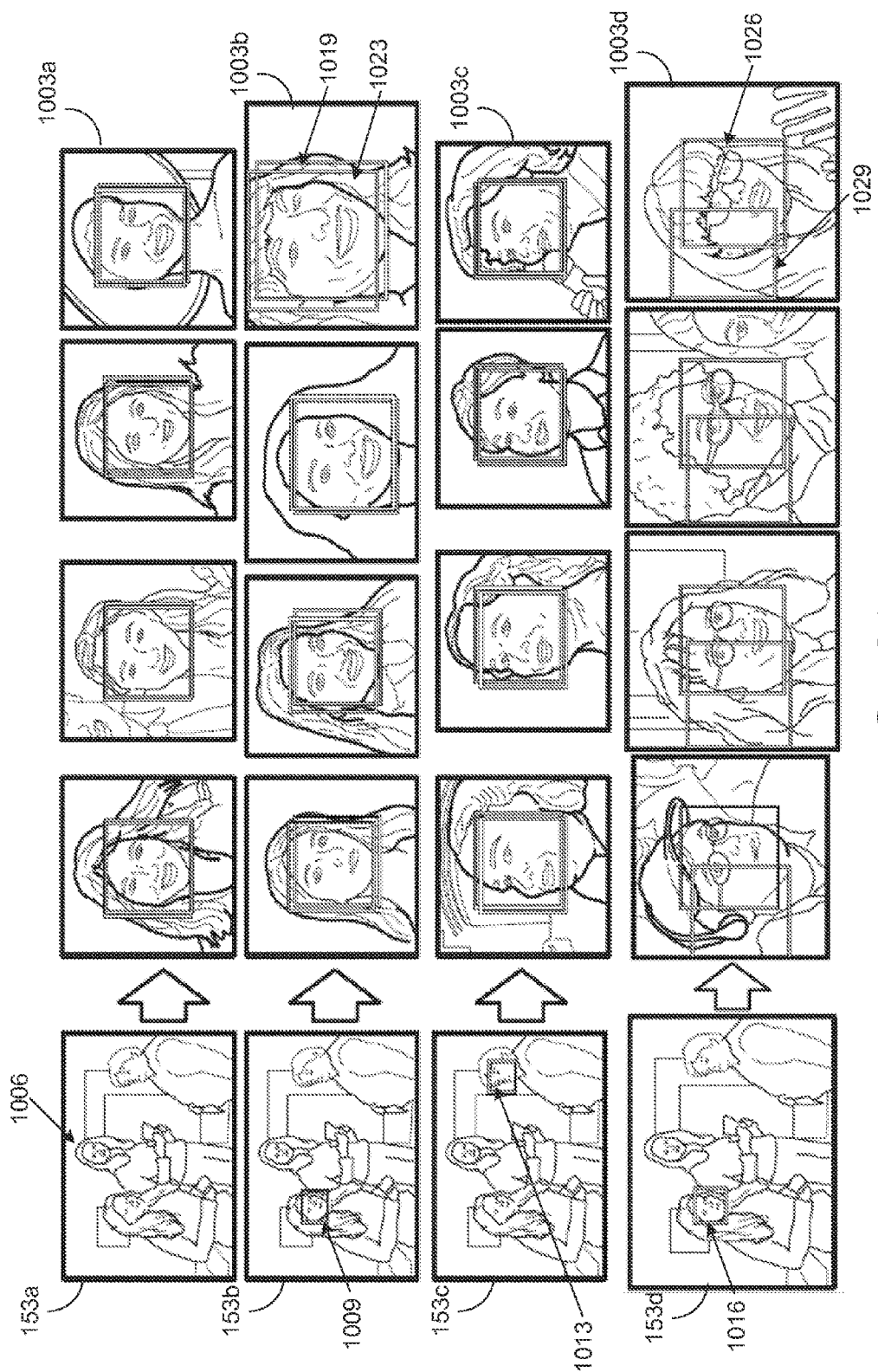
FIG. 10 is an illustration of validating object images that have been detected as depicting a similar object as a test image.

FIG. 10 illustrates the validation service 144 that generates a validation score for each candidate sub-rectangle in the test image 153 (FIG. 2) based on the localized objects in detected object images 159 (FIG. 2) and the known locations of the objects in the object images 159. FIG. 10 includes a test image 153 that was detected to include three different rectangles indicating a location of three different objects. In this example, the objects are faces of three different individuals. A first test image 153*a* depicts a first rectangle that identifies the face of the individual in the middle as indicated by rectangle 1006 around the middle face, a second test image 153*b* depicts a second rectangle that identifies the face of the individual to the left as indicated by rectangle 1009 around the left face, and a third test image 153*c* depicts a third rectangle that identifies the face of the individual to the right as indicated by rectangle 1013 around the right face. The fourth test image 153*d* depicts a fourth rectangle that identifies what was determined to also be the individual on the left as indicated by rectangle 1016. However, as will be discussed, the fourth test image 153*d* incorrectly identifies the location of the individual on the left.

In one embodiment, the object images 159 depicted in FIG. 10 may have been previously identified by the detection service 143. For example, the detection service 143 may have previously detected the object images 159 that are similar to each one of the faces of the test images 153*a*, 153*b*, 153*c* and 153*d* based on similarity scores and similarity voting maps, as discussed above. Each test image 153*a*, 153*b*, 153*c* and 153*d* has a corresponding set of object images 1003*a*, 1003*b*, 1003*c* and 1003*d*. Further, each object image 159 in the set of object images 1003*a*, 1003*b*, 1003*c* and 1003*d* may be depicted in a ranked order. For example, the object images 159 may be ranked based on the similarity score where the object image 159 closest to the test image 153 exhibits the highest similarity score. In another embodiment, the object images 159 may be ranked as described in U.S. patent application Ser. No. 13/552,595 entitled "Image Retrieval with Spatially-Constrained Similarity Measure and k-NN re-ranking" filed on Jul. 18, 2012 which is hereby incorporated by reference in its entirety.

Additionally, each object image 159 in the set of object images 1003a, 1003b, 1003c and 1003d includes two rectangles. A first rectangle represents a known location of the face of the individual depicted in the object image 159. For instance, the first rectangle, shown as known rectangle 1019 in one of the object images 159 in the set of object images 1003b, may be indicated by ground truthing where the location was manually indicated. For instance, the object images 159 in the set of object images 1003 may be retrieved from an object repository 156 where all of the object images 159 in the object repository 156 were manually identified with an indicator indicating the location of the object depicted in the object image 159, a process referred to as "ground trothing."

A second rectangle shown as determined rectangle 1023 in the same object image 159 in the set of object images 1003b, represents the location of the face of the individual determined from localization of the object depicted in the object image 159. For instance, the location of the face in the object image 159 may be localized from the corresponding test image 153. In one embodiment, the generalized Hough voting approach may be applied to localize the object in the object image 159. In another embodiment, the same similarity measure S(x, c) as discussed above may be used to identify the location of the object in the object image 159 where x is the respective object image 159 in the set of object images 903 and c is the test image 153. For instance, the highest similarity score between the matching features of the object image 159 in the set of object images 1003 and the test image 153 may be correspond to the center of the object in the object image 153 according to this localization approach.

The validation service 144 generates a validation score based on the accuracy of the localized second sub-rectangle with respect to the known first sub-rectangle. For example, the validation service 144 generates the validation score based on an amount of overlap between the first sub-rectangle and the second sub-rectangle, an amount of the first sub-rectangle not overlapping the second sub-rectangle, an amount of the second sub-rectangle not overlapping the first sub-rectangle, and/or otherwise based on the accuracy of the second localized second sub-rectangle with respect to the first known sub-rectangle. In one embodiment, validation service 144 determines an overlap ratio for each object image 159 as defined by:

$$R_i(x) = \frac{l_i \cap g_i}{l_i \cup g_i}$$

where $l_i$ represents the localized second sub-rectangle of the i-th object image 159 and $g_i$ represents the known first sub-rectangle of the i-th object image 159. Then, the validation service 144 determines the validation score for each candidate rectangle in the test image 153 defined by:

$$V(x) = \sum_{\substack{i=1 \\ R_i(x) > \theta}}^{k} s_i(x) \times R_i(x)$$

where $s_i(x)$ is the similarity score as previously generated between the test image 153 and the i-th object image 159. $R_i(x) > \theta$ indicates that only object images 159 with an overlap ratio greater than $\theta$ are considered for generating the validation score. For example, $\theta$ may be equal to 0.6. If the overlap ratio is too low (for example, lower than 0.6) then the detected object image 159 is likely not a good match and therefore should not contribute to the validation score. A validation score of 1 indicates that the localized sub-rectangle completely overlaps the known rectangle and thus the candidate rectangle in the test image 153 is a perfect detection. A validation score of 0 indicates that the localized rectangle does not overlap the known rectangle and thus the candidate rectangle in the test image 153 is a bad detection. Next, the validation service 144 generates a final detection score for each candidate rectangle in the test image 153, defined as follows:

$$\text{Final Score} = \alpha S(x) + (1-\alpha)V(x)$$

where $\alpha$ is a constant between 0 and 1. The final detection score represents a linear combination of the aggregate similarity score and the validation score where $\alpha$ is a weight to control the combination. The $\alpha$ value may be an integer and may be determined experimentally via a cross validation process. In one embodiment, the detection score indicates a level of confidence that the detected candidate sub-rectangle in the test image 153 identifies a location of an object in the test image 153.

As discussed above, if the overlap ratio is too low then the detected object images 159 in the set of object images 1003 is not a good match. The set of object images 1003d includes known rectangles and determined rectangles in each object image 159 that do not sufficiently overlap. For instance, each of the known rectangles identifies the location of the face in the object image 159 where the known rectangle is centered at the center of the face. Each of the determined rectangles is skewed and incorrectly identifies the face in the respective object images 159. For example, the center of known rectangle 1026 identifies the center of the face of the object image 159 while the center of the determined rectangle 1029 incorrectly identifies the center of the face of the same object image 159. The validation service 144 calculates the amount of overlap between the known rectangle 1026 and the determined rectangle 1029 and if the overlap is below the threshold amount, disregards the object image 159 as a false positive.

Figure 11:
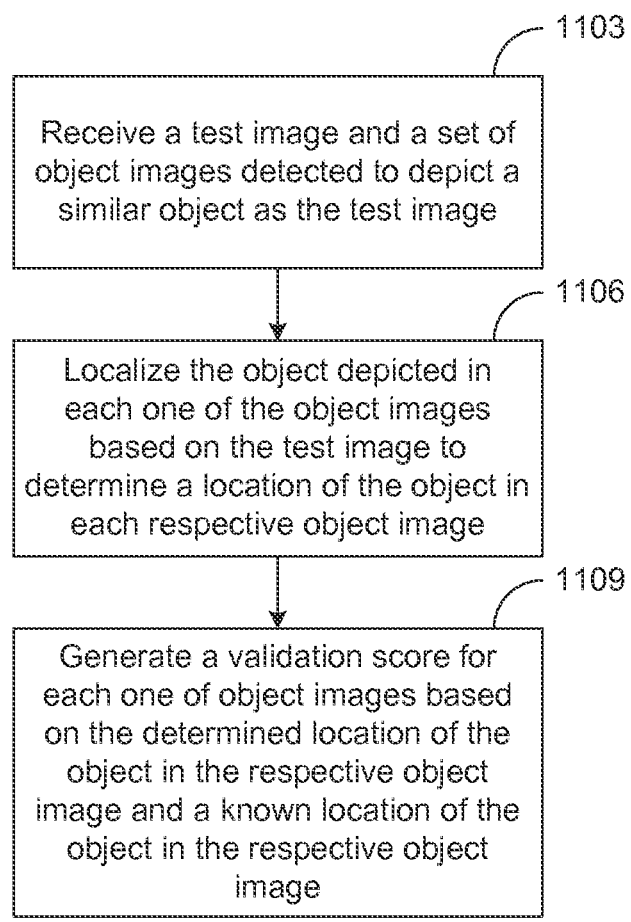
FIG. 11 is a flow chart illustrating an exemplary method of a validation service for verifying that the detected image is similar to the test image.

FIG. 11 is a flowchart that provides one example of the operation of a portion of the validation service 144 (FIG. 2) according to certain embodiments. It is understood that the flowchart of FIG. 11 provides merely an example of the many different types of functional arrangements that may be employed to implement the operation of the portion of the validation service 144 as described herein. As an alternative, the flowchart of FIG. 11 may be viewed as depicting an example of steps of a method implemented in the computing device 103 (FIG. 2) according to one or more embodiments.

Beginning with step 1003, the validation service 144 receives a test image 153 and a set of object images detected to depict a similar object as the test image 153. Each object image 159 in the set of object images may have been detected to depict a similar object as the test image 153 based on similarity scores between the two images, a generalized Hough algorithm, and/or another approach for detection. In one embodiment, the set of object images may include top-ranked object images based at least in part on a similarity score between the object images 159 in the set of top ranked object images and the test image 153.

In step 1006, the validation service 144 localizes the object depicted in each one of the object images 159 based on the test image 153 to determine a location of the object in each respective object image 159. In one embodiment, the detection service 144 determines the location based on the similarity scores between the two images. For example, the validation service 144 may invoke the similarity voting service 139 to generate a similarity voting map where the portion of the map that represents the highest similarity corresponds to a center of the object depicted in the object image 159. In another embodiment, the validation service 144 may apply another detection algorithm such as a generalized Hough voting approach and/or another approach.

Then, in step 1009, the validation service 144 generates a validation score for each one of the object images 159 based on the determined location of the object in the respective object image 159 and a known location of the object in the respective object image 159. In one embodiment, the location of the object in the object image 159 may have been previously identified via the ground truthing process where a user manually identifies the location of the object. The validation service 144 generates a validation score based on a comparison between the determined location of the object in the object image 159 and the manually identified location of the object in the object image 159. For instance, the validation service 144 generates the validation score based on an amount of overlap. In one embodiment, the validation service 144 also generates a detection score for each object image 159 in the set of top ranked detected object images based on the validation score for each object image 159 and an aggregate similarity score between the object images 159 and the test image 153. The validation service 144 may then use the object image 159 with the highest detection score to define the location of the object in the test image 153.

Figure 12:
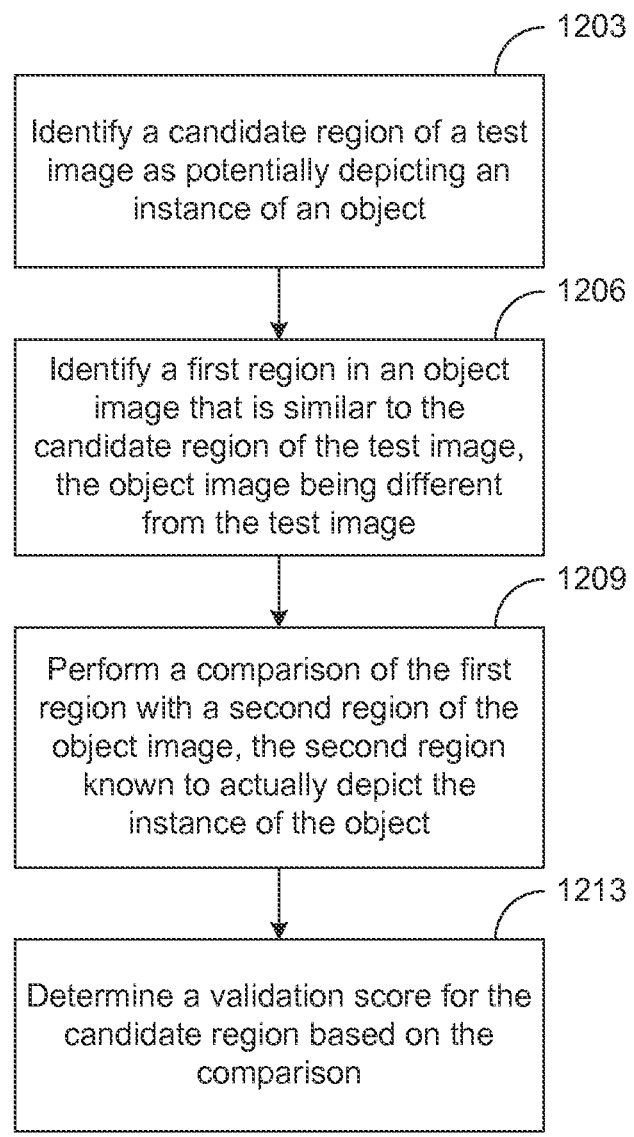
FIG. 12 is a flow chart illustrating another exemplary method of a validation service for verifying that the detected image is similar to the test image.

FIG. 12 is a flowchart that provides one example of the operation of a portion of the validation service 144 (FIG. 2) according to certain embodiments. It is understood that the flowchart of FIG. 12 provides merely an example of the many different types of functional arrangements that may be employed to implement the operation of the portion of the validation service 144 as described herein. As an alternative, the flowchart of FIG. 12 may be viewed as depicting an example of steps of a method implemented in the computing device 103 (FIG. 2) according to one or more embodiments.

Beginning with step 1203, the validation service 144 identifies a candidate region of a test image 153 as potentially depicting an instance of an object. In one embodiment, the candidate region of the test image 153 may have been identified by the detection service 143 as described above. For example, the detection service 143 may have determined the candidate region to be an estimated location of the object in the test image 153 based at least in part on similarity scores between the test image 153 and one or more object images 159 (FIG. 2) in an object repository 156 (FIG. 2).

Next, in step 1206, the validation service 144 identifies a first region in an object image 159 that is similar to the candidate region of the test image 153, the object image 159 being different from the test image 153. For instance, the object image 159 may belong to a set of object images that includes top-ranked object images based at least in part on a similarity score between the object images 159 in the set of top ranked object images and the test image 153. In one embodiment, the validation service 144 identifies the first region by localizing the object depicted in each one of the object images 159 based on the test image 153 to determine a location of the first region in each respective object image 159. In one embodiment, the detection service 144 determines the location based on the similarity scores between the two images. For example, the validation service 144 may invoke the similarity voting service 139 to generate a similarity voting map where the portion of the map that represents the highest similarity corresponds to a center of the object depicted in the object image 159. In another embodiment, the validation service 144 may apply another detection algorithm such as a generalized Hough voting approach and/or another approach.

In step 1209, the validation service 144 performs a comparison of the first region with a second region of the object image 159, the second region known to actually depict the instance of the object. In one embodiment, the second region may have been manually indicated to define the location of the object in the object image 159. The validation service 144 compares the dimensions of the first region and the second region to determine an accuracy of the candidate region of the test image 153. For example, an exact match in the dimensions between the first region and the second region may indicate that the candidate region exactly identifies the object in the test image 153. The validation service 144 determines a validation score for each candidate region based on this comparison. For instance, the validation score may be based on an amount of overlap between the first region and the second region.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
    identifying a candidate region of a test image as potentially depicting an instance of an object;
    identifying a first region in an object image that is similar to the candidate region of the test image, the object image being different from the test image;
    performing a comparison of the first region with a second region of the object image, the second region known to actually depict the instance of the object; and
    determining a validation score for the candidate region based on the comparison,
    wherein identifying the candidate region, identifying the first region, performing the comparison, and determining the validation score are performed by a processor of a computer device executing instructions.

2. The method of claim 1, wherein the validation score is determined based on multiple comparisons involving multiple object images, each comparison comprising a respective localized region based on the candidate region and a respective known region at which a respective instance of the object is known.

3. The method of claim 2, wherein the multiple object images are a subset of possible object images selected based on the object images of the subset having higher similarity scores with respect to the test image than other object images of the possible object images.

4. The method of claim 1, wherein the object is a face.

5. A computer-implemented method comprising:
    receiving, at a computing device comprising a processor, a test image;
    identifying at least one candidate rectangle in the test image potentially depicting an instance of an object and a region in each of a set of object images that is similar to each respective candidate rectangle, the object images of the set being different from the test image;
    performing a comparison of each of the regions with another region in the same object image, the another region known to actually depict an instance of the object; and
    generating a validation score for the at least one candidate rectangle based at least in part on the comparison.

6. The computer-implemented method of claim 5, wherein the identified at least one candidate rectangle is manually identified.

7. The computer-implemented method of claim 5, wherein determining the region is based at least in part on the at least one candidate rectangle in the test image.

8. The computer-implemented method of claim 5, wherein the determined region is represented by a first rectangle and the known location of the instance of the object depicted in the object image is represented by a second rectangle.

9. The computer-implemented method of claim 5, wherein the validation score for the at least one candidate rectangle is based at least in part on an amount of overlap between the determined region and the known location of the instance of the object depicted in the object image.

10. The computer-implemented method of claim 9, wherein the validation score for the at least one candidate rectangle is based at least in part on an area of overlap between the first rectangle and the second rectangle.

11. The computer-implemented method of claim 5, further comprising generating a final detection score for the at least one candidate rectangle based at least in part on a similarity score between the test image and the object image and the validation score of the at least one candidate rectangle, the final detection score representing a confidence level that an object is located as indicated by the at least one candidate rectangle.

12. A system comprising:
    a processor for executing instructions stored in computer-readable medium on one or more devices,
    the instructions comprising one or more modules configured to perform the steps comprising:
        receiving a test image having a candidate face and a set of top-ranked object images, each one of the top-ranked images having a face detected to be similar to the candidate face of the test image;
        ranking the object images in the set of top-ranked object images based at least in part on a similarity score;
        generating a validation score for the candidate face based at least in part on localization of the object in each of the top-ranked images using the test image; and
        generating a detection score for the candidate face based at least in part on the validation score for the candidate face and a similarity score between the test image and the respective object image.

13. The system of claim 12, wherein generating the validation score for the candidate face based at least in part on localization of the object in each of the top-ranked images using the test image comprises:
    determining a location of the object depicted in the object image based at least in part on generating a similarity measure between matching features of the candidate face of test image and the respective object image; and
    comparing the determined location of the object in the object image with an identified location of the object in the object image.

14. The system of claim 13, wherein the localization yields a sub-rectangle based on spatial information of the object depicted in the test image.

15. The system of claim 13, wherein the determined location of the object depicted in the object image is represented by a first sub-rectangle and the identified location of the object depicted in the object image is represented by a second sub-rectangle.

16. The system of claim 12, wherein the validation score is based at least in part on an amount of overlap between the determined location of the object in the object image and the known location of the object in the object image.

17. The system of claim 15, wherein the validation score is based at least in part on an area of overlap between the first sub-rectangle and the second sub-rectangle.

18. The system of claim 13, wherein the identified location is manually identified.

19. The system of claim 15, where in the validation score is based at least in part on an overlap ratio between the first sub-rectangle and the second sub-rectangle.

20. The system of claim 19, wherein the detection score for the candidate face represents a confidence level that a face depicted in the test image is located as indicated by the candidate face.

21. A method comprising:
receiving a test image having a candidate object and a set of object images detected to depict an object similar to the test image;
ranking the object images based on a similarity between the respective object image and the test image;
localizing each object image to determine a location of the object in the object image based at least in part on the candidate object in the test image; and
generating a validity score for the candidate object based at least in part on the determined location of the object in the object image and an identified location of the object in the object image; and
generating a detection score for the candidate object based at least in part on the validity score for the respective object image and a similarity score between the respective object image and the test image.

22. The method of claim 21, wherein the identified location of the object in the object image is manually identified.

23. The method of claim 21, wherein the validity score for the candidate object image is further based at least in part on an amount of overlap between the determined location of the object in the object image and the identified location of the object in the object image.

* * * * *